US010967903B2

(12) United States Patent
Uemura et al.

(10) Patent No.: US 10,967,903 B2
(45) Date of Patent: Apr. 6, 2021

(54) ELECTRICALLY POWERED WORK VEHICLE

(71) Applicant: Kubota Corporation, Osaka (JP)

(72) Inventors: Katsuhiko Uemura, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 35 days.

(21) Appl. No.: 16/185,303

(22) Filed: Nov. 9, 2018

(65) Prior Publication Data
US 2019/0193783 A1 Jun. 27, 2019

(30) Foreign Application Priority Data

Dec. 21, 2017 (JP) .............................. JP2017-244804

(51) Int. Cl.
B62D 6/08 (2006.01)
B60L 15/32 (2006.01)
B60K 7/00 (2006.01)
B62D 11/04 (2006.01)
B62D 11/00 (2006.01)
B60L 15/20 (2006.01)
B60L 1/00 (2006.01)
(Continued)

(52) U.S. Cl.
CPC .............. B62D 6/08 (2013.01); B60K 7/0007 (2013.01); B60L 1/003 (2013.01); B60L 15/20 (2013.01); B60L 15/32 (2013.01); B62D 11/003 (2013.01); B62D 11/04 (2013.01); A01D 34/006 (2013.01); A01D 34/66 (2013.01); B60L 2240/20 (2013.01)

(58) Field of Classification Search
CPC ...... B60L 15/20; B60L 15/32; B60L 2240/20; A01D 34/66
USPC .......................................................... 701/41
See application file for complete search history.

(56) References Cited

U.S. PATENT DOCUMENTS 8,490,722 B2 7/2013 Koga et al.
2009/0026984 A1 1/2009 Nakamura et al.
2010/0138128 A1 6/2010 Strothmann et al.
(Continued)

FOREIGN PATENT DOCUMENTS

JP 2005151691 A 6/2005
JP 2009144757 A 7/2009
(Continued)

Primary Examiner — Nicholas K Wiltey
Assistant Examiner — Terry C Buse
(74) Attorney, Agent, or Firm — The Webb Law Firm

(57) ABSTRACT

An electrically powered work vehicle includes a left driving wheel and a right driving wheel that are supported to a vehicle body, a left motor for driving the left driving wheel and a right motor for driving the right driving wheel, a steering wheel, an acceleration operation tool, a turning command calculation section for calculating a turning command based on a steering operation amount of the steering wheel, a turning torque calculation section for calculating a turning torque based on the turning command, a vehicle speed command calculation section for calculating a vehicle speed command based on an acceleration operation amount of the acceleration operation tool, a vehicle speed torque calculation section for calculating a vehicle speed torque based on the vehicle speed command, and a speed command calculation section for calculating a left motor speed command and a right motor speed command based on the turning torque and the vehicle speed torque.

1 Claim, 5 Drawing Sheets

(51) Int. Cl.
*A01D 34/00* (2006.01)
*A01D 34/66* (2006.01)

(56) References Cited

U.S. PATENT DOCUMENTS

| 2011/0127093 A1* | 6/2011 | Koga | B62D 11/04 |
|---|---|---|---|
| | | | 180/6.24 |
| 2013/0268165 A1 | 10/2013 | Hashima et al. | |
| 2015/0039171 A1 | 2/2015 | Koike et al. | |

FOREIGN PATENT DOCUMENTS

| JP | 2011115006 A | 6/2011 |
|---|---|---|
| JP | 2011234451 A | 11/2011 |
| JP | 201524745 A | 2/2015 |
| WO | 2014162830 A1 | 10/2014 |

* cited by examiner

ELECTRICALLY POWERED WORK VEHICLE

CROSS-REFERENCE TO RELATED APPLICATION

This application claims priority to Japanese Patent Application No. 2017-244804 filed Dec. 21, 2017, the disclosure of which is hereby incorporated in its entirety by reference.

TECHNICAL FIELD

This disclosure relates to an electrically powered work vehicle including a left motor for driving a left driving wheel, a right motor for driving a right driving wheel, and a traveling control section configured to control the left motor and the right motor independently based on a steering operation amount by a steering wheel and an acceleration operation amount by an acceleration operation tool.

BACKGROUND DISCUSSION

A work vehicle according to Patent Document 1 includes left and right driving wheels driven independently for traveling by two traveling motors, an accelerator pedal for accelerating a vehicle body to a forward side or a reverse side, and a steering wheel for steering the vehicle body to the left/right. This work vehicle includes a command calculation means for calculating target rotational speed command values for the left and right traveling motors based on an acceleration instruction (vehicle speed instruction) and a turning instruction given by a driver with using the accelerator pedal and the steering wheel, a target yaw rate calculation means for calculating a target yaw rate based on the acceleration instruction and the turning instruction, a correction coefficient acquisition means for acquiring a correction coefficient for the left and right traveling motors based on a difference between the target yaw rate and a yaw rate detected by a yaw rate detection means, and a control means. The control means corrects the left and right target rotational speed instruction values respectively by the correction coefficient and controls driving of the left and right traveling motors, based on the corrected target rotational speed instruction values. With this, even when the vehicle travels on a sloped surface, the vehicle can travel in a direction intended by the driver.

BACKGROUND ART DOCUMENT

Patent Document

Patent Document 1: Japanese Unexamined Patent Application Publication No. 2011-115006

SUMMARY

Problem to be Solved by Invention

According to the work vehicle of Patent Document 1, the rotational speed instruction values for the left and right motors are produced by adjusting a motor rotational speed calculated based on an acceleration instruction (vehicle speed instruction) by the accelerator pedal by a rotational speed ratio between the left and right motors calculated based on a turning instruction by the steering wheel. Further, based on the acceleration instruction and the turning instruction, a target turning angular velocity is calculated. Then, based on a difference between this target turning angular velocity and an actual turning angular velocity detected by an angular velocity sensor, a correction coefficient is calculated. Further, based on rotational speed instruction values for the left and right motor corrected by this correction coefficient, drives of the left and right motor are controlled. In this way, the left and right motor rotational speed instruction values calculated by combining the acceleration instruction by the accelerator pedal and the turning instruction by the steering wheel are corrected based on the information on the feedback-controlled turning angular velocities. Thus, uniform steering is made possible whether it is a sloped land or a flat land. However, the motor control technique according to Patent Document 1 not only complicates the control system, but also can cause a problem of making the operational feel of turning traveling dull compared with straight traveling for a driver who prefers agile driving feel, as a result of the integration of turning control and vehicle speed control.

In view of the above, there is a need for an electrically powered work vehicle of a steering wheel type that has a simple motor control system, but provides agile turning traveling.

Solution

An electrically powered work vehicle according to the present invention comprises:

a vehicle body;

a left driving wheel and a right driving wheel that are supported to the vehicle body;

a left motor for driving the left driving wheel and a right motor for driving the right driving wheel;

a steering wheel for steering the vehicle body;

an acceleration operation tool for adjusting a traveling speed of the vehicle body;

a steering detector for detecting a steering operation amount of the steering wheel;

an acceleration detector for detecting an acceleration operation amount of the acceleration operation tool;

a turning command calculation section for calculating a turning command based on the steering operation amount;

a turning torque calculation section for calculating a turning torque based on the turning command;

a vehicle speed command calculation section for calculating a vehicle speed command based on the acceleration operation amount;

a vehicle speed torque calculation section for calculating a vehicle speed torque based on the vehicle speed command; and a speed command calculation section for calculating a left motor speed command and a right motor speed command based on the turning torque and the vehicle speed torque.

With the above-described arrangement, on one hand, a turning torque is calculated based on a turning command by the steering wheel. On the other hand, a vehicle speed torque is calculated based on a vehicle speed command by the acceleration operation tool. From the turning torque and the vehicle speed torque detected by separate systems, a left motor speed command and a right motor speed command are calculated respectively, by which the left motor and the right motor are controlled. Namely, a torque change degree for calculation of the turning torque from the turning command can be made stronger than a torque change degree for calculation of the vehicle speed torque from the vehicle speed command. With this, both driving stability at time of straight traveling and agile turning performance at time of turning traveling can be obtained.

According to one preferred embodiment of the present invention, the turning torque calculation section calculates the turning torque based on a turning angular velocity calculated from the turning command. With this arrangement, a left turning or a right turning by a driver's steering wheel operation is obtained as its angular velocity. Thus, the steering wheel operation is made to correspond to the turning speed, so that agile turning can be realized. In particular, with a work vehicle that travels on an unpaved land surface, the vehicle speed at time of turning can vary as being subjected to an influence from e.g. a traveling surface condition, a load weight, etc. However, by setting the turning speed to a control target, even in a bad land surface condition which gives turning resistance, such problem as deterioration in the agility of turning adverse to the driver's operational feel can be suppressed advantageously.

In particular, according to one preferred embodiment, the turning torque calculation section is configured to calculate the turning torque, based on an actual turning angular velocity calculated from a detection signal of an angular velocity sensor and the turning angular velocity. With provision of the angular velocity sensor, the actual turning angular velocity of the vehicle body can be calculated even more accurately. With this, turning suited to the driver's operational feel preference is made possible.

Even when no angular velocity sensor is provided, the actual turning angular velocity can be estimated from a left motor speed and a right motor speed, and the unique specification of the vehicle body, in particular, its turning characteristics. And, by calculating the turning torque as a control amount with using such estimated actual turning angular velocity, turning suited to the driver's operational feel preference is made possible. Therefore, according to one preferred embodiment of the present invention, the turning torque calculation section is configured to calculate the turning torque, based on an actual turning angular velocity of the vehicle body estimated from the left motor speed command and the right motor speed command and the turning angular velocity.

EMBODIMENT

Next, with reference to the accompanying drawings, one specific embodiment of an electrically powered work vehicle relating to the present invention will be explained.

In this embodiment, the electrically powered work vehicle is configured as a mid-mount type electrically powered grass mower. Incidentally, in this detailed disclosure, unless indicated otherwise, a word "front" means the front side with respect to a vehicle body front/rear direction (traveling direction) and a word "rear" means the rear side with respect to the vehicle body front/rear direction (traveling direction). Further, a word "left/right direction" or "lateral direction" means the vehicle body traverse direction (vehicle body width direction) perpendicular to the vehicle body front/rear direction. A word "upper" or "lower" refers to the positional relationship with respect to the perpendicular direction (vertical direction) of the vehicle body and indicates the relationship in the respect of the ground clearance.

Figure 1:
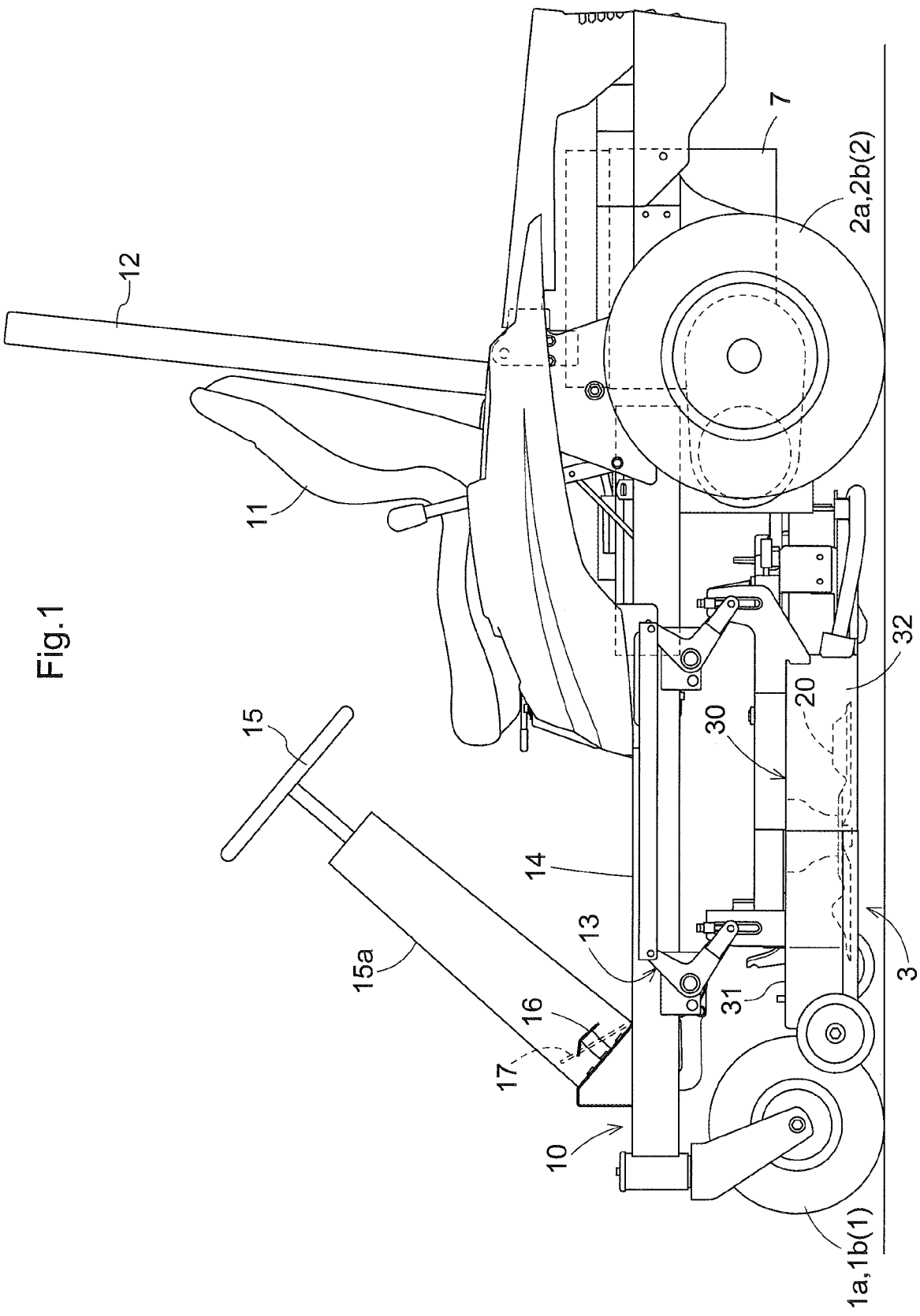
FIG. 1 is a side view showing a mid-mount type riding electrically powered grass mower as an example of an electrically powered work vehicle relating to the present invention.

FIG. 1 is a side view of the electrically powered grass mower (to be referred to simply as "grass mower" hereinafter). This grass mower includes a front wheel unit 1 consisting of a left front wheel 1a and a right front wheel 1b both of freely rotatable caster type, a driving wheel unit 2 consisting of a left driving wheel 2a and a right driving wheel 2b, a frame-like vehicle body 10 supported by the front wheel unit 1 and the driving wheel unit 2, a battery 7 mounted at a rear portion of the vehicle body 10, a driver's seat 11 disposed forwardly of the battery 7, a ROPS frame 12 mounted vertically from the rear side of the driver's seat 11, and a mower unit 3 suspended from the vehicle body 10 to be liftable up/down via a lift link mechanism 13 downwardly of the vehicle body 10 and between the front wheel unit 1 and the driving wheel unit 2.

Forwardly of the driver's seat 11, a steering wheel 15 supported to a handle post 15a is provided for steering the vehicle body 10. In the periphery of the handle post 15a, there is provided a floor plate 14 as a driver's footrest. A brake pedal 16 is disposed on one side in the left-right direction of the handle post 15a. On the other side thereof, there is provided an accelerator pedal 17 as an example of "acceleration operation tool" for adjusting a traveling speed (vehicle speed) of the vehicle body 10. In the instant embodiment, the accelerator pedal 17 is configured as one pedal type for adjusting a forward traveling speed from a neutral position in response to a step-on operation by the driver and adjusting a reverse traveling speed by a rearward pivotal movement thereof from the neutral position. Instead of this one pedal type, it is also possible to employ two pedal type arrangement consisting of a forward pedal for adjusting a forward traveling speed and a reverse pedal for adjusting a reverse traveling speed. Further alternatively, a hand-operation type acceleration operation tool may be employed also.

An operation amount on the accelerator pedal 17 (an acceleration operation amount) determines a speed (vehicle speed) in the forward/reverse traveling of the vehicle body 10 which is calculated from rotational speeds of the left driving wheel 2a and the right driving wheel 2b. The steering wheel 15 is configured such that the greater the left/right angle from the neutral position, the greater the difference to be provided between the rotational speed of the left driving wheel 2a and the rotational speed of the right driving wheel 2b. Namely, when the left driving wheel 2a and the right driving wheel 2b are driven at different speeds, the vehicle body 10 makes a turn. When the rotational directions of the left driving wheel 2a and the right driving wheel 2b are opposite to each other, a sharp turn will be realized. For this reason, this grass mower is referred to also as a "steering wheel type zero-turn mower".

Figure 2:
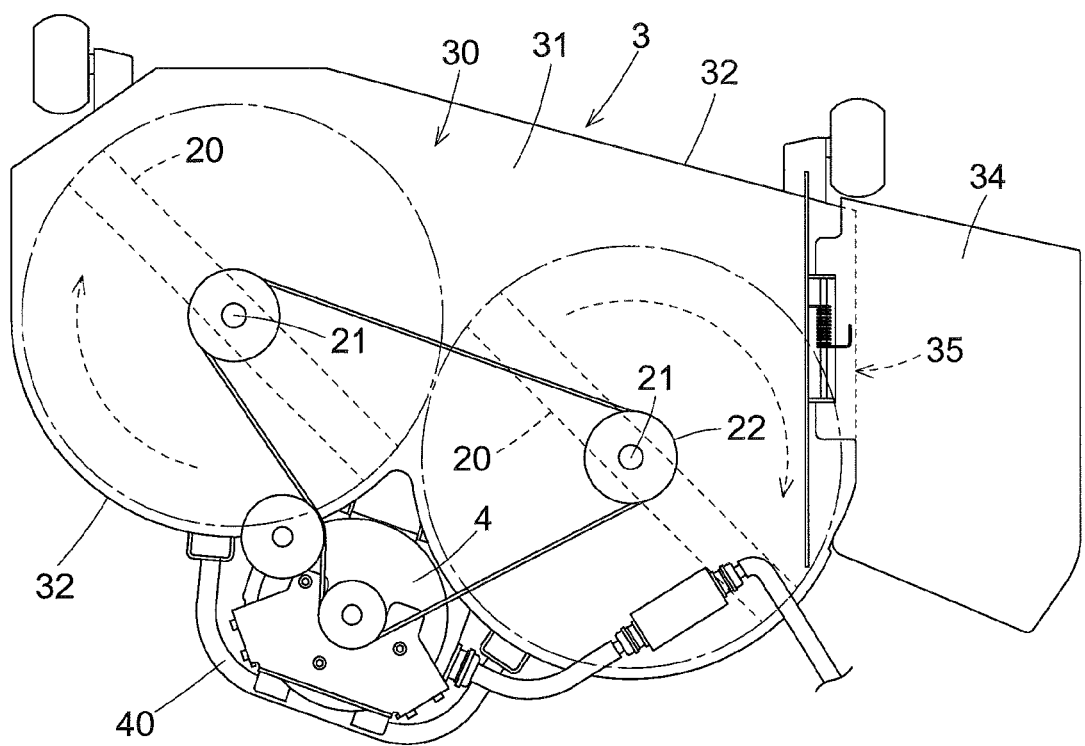
FIG. 2 is a plan view of a mower unit.

The mower unit 3, as shown in FIG. 2, is of a side discharge type, including a mower deck 30 and two rotary type cutter blades 20. The left cutter blade 20 and the right cutter blade 20 are disposed side by side in the vehicle body transverse direction. The mower deck 30 includes a top wall 31 and a side wall 32 extending downwards from the outer circumferential edge of the top wall 31. The right end area of the side wall 32 is cutaway, and creates a grass discharge opening 35 covered by a cover 34. Each cutter blade 20 is disposed in an inner space of the mower deck 30 created by the top wall 31 and the side wall 32.

The cutter blade 20 is provided as a band-plate like member and forms cutting edges at its opposed end portions. Further, on the rear side of the cutting edges, a wind raising vane is formed. The cutter blade 20 is attached to a lower end of a cutter blade rotational shaft 21 which extends downwards through the top wall 31 of the mower deck 30. At time of a grass cutting work, the grass mower will travel with the cutter blades 20 being rotated, so that grass clippings cut by the cutter blades 20 will be guided by a conveying wind generated by the vanes to a baffle plate provided inside the mower deck 30 to pass through the inside of the mower deck 30 to be eventually discharged to the lateral outer side via the cut grass discharge opening 35. A mower motor 4 for supplying power to the cutter blades 20 is attached to a mount deck 40 which protrudes horizontally from the side wall 32. A rotational power of a rotational shaft 41 of the mower motor 4 is transmitted via a belt transmission mechanism to the cutter blade rotational shafts 21 of the respective cutter blades 20.

Figure 3:
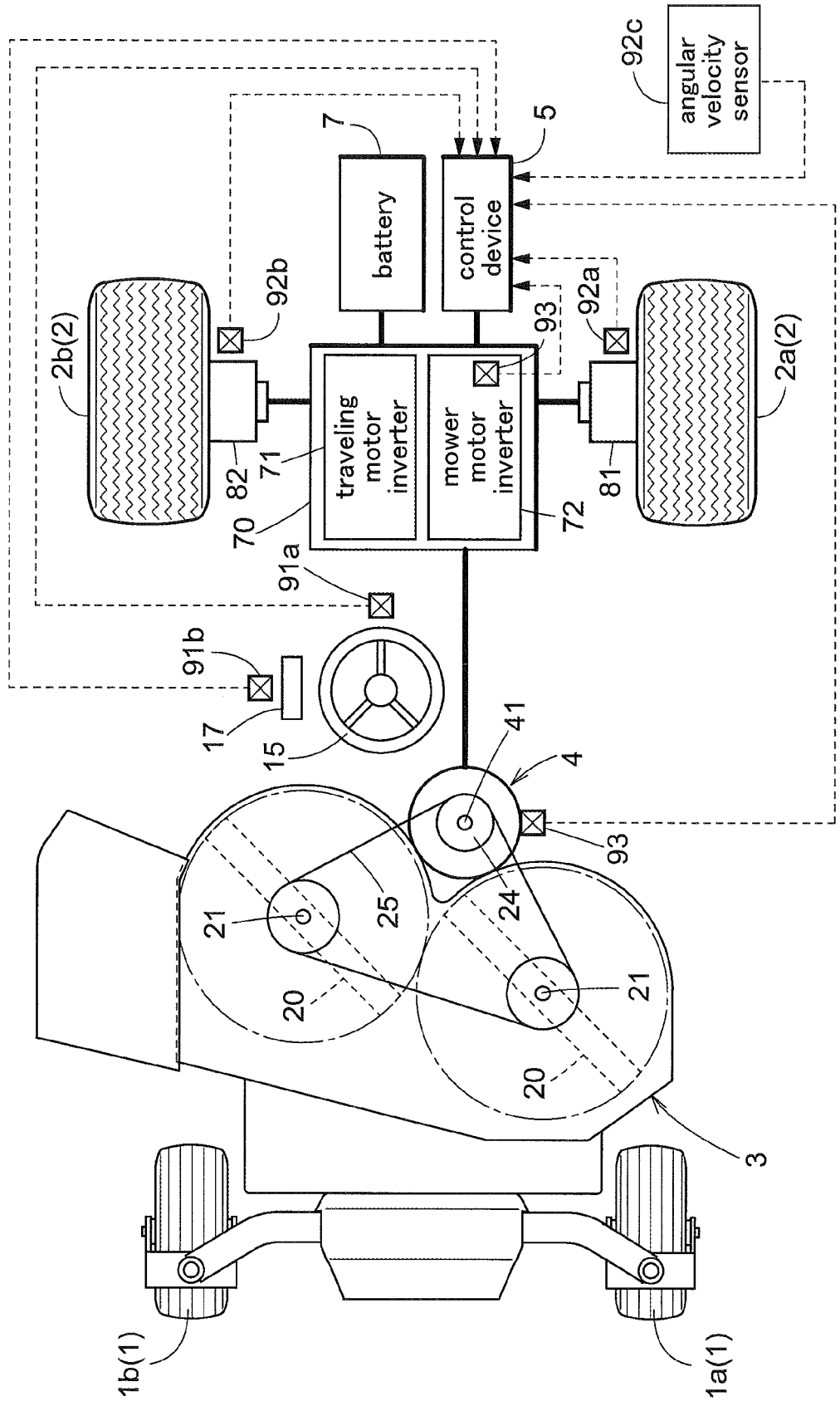
FIG. 3 is a diagram showing a power system and a control system of the electrically powered grass mower.

FIG. 3 shows a power system and a control system of the electrically powered grass mower. A left motor 81 and a right motor 82 that respectively rotate the left driving wheel 2a and the right driving wheel 2b, and the mower motor 4 for rotating the cutter blades 20 receive supply of electric power via an inverter 70. This inverter 70 includes a traveling motor inverter 71 for supplying power to the left motor 81 and the right motor 82 and a mower motor inverter 72 for supplying power to the mower motor 4. The inverter 70 is driven based on control signals from a control device 5. The inverter 70 is connected to the battery 7 as a power source.

Figure 4:
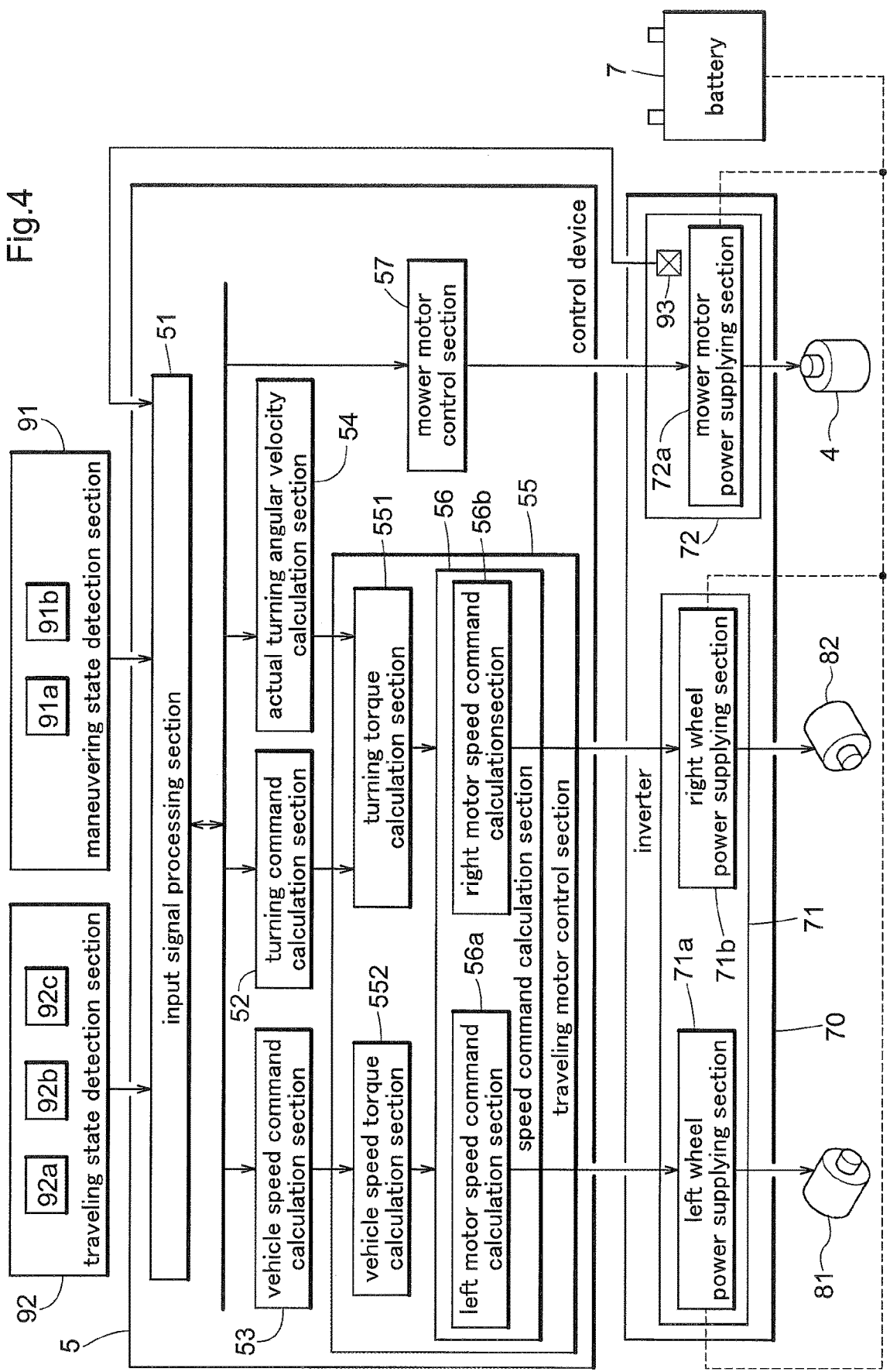
FIG. 4 is a functional block diagram of the control system.

As shown in FIG. 4 which is a functional block diagram of the control system, the control device 5 inputs detection signals from a maneuvering state detection section 91 and a traveling state detection section 92. The maneuvering state detection section 91 includes a steering detector 91a and an acceleration detector 91b. The traveling state detection section 92 includes a left motor rotation detection sensor 92a, a right motor rotation detection sensor 92b and an angular velocity sensor 92c.

The steering detector 91a detects a rotation angle of the steering wheel 15 and outputs its detection signal as a "steering operation amount". The acceleration detector 91b detects a pivotal angle of the accelerator pedal 17 (stepped-on angle) and outputs its detection signal as an "acceleration operation amount". The left motor rotation detection sensor 92a detects a rotational speed of the left motor 81. The right motor rotation detection sensor 92b detects a rotational speed of the right motor 82. The mower motor rotation detection sensor 93 detects a rotational speed of the mower motor 4. The angular velocity sensor 92c is a sensor for detecting a yaw angular velocity (turning angular velocity) of the vehicle body 10. Based on this detection signal, an actual steering state of the vehicle body 10 based on the rotational operation on the steering wheel 15 will be inputted to the control device 5.

The control device 5 includes, as functional sections, an input signal processing section 51, a turning command calculation section 52, a vehicle speed command calculation section 53, an actual turning angular velocity calculation section 54, a traveling motor control section 55, and a mower motor control section 57. These functional sections are constituted of hardware and/or software. The input signal processing section 51 processes signals "from the outside" such as those from the traveling state detection section 92 and the maneuvering state detection section 91, etc. and converts these into information usable inside the control device 5.

As shown in FIG. 2, the turning command calculation section 52, upon receipt of a steering operation amount from the steering detector 91a, calculates a steering command indicating a left turning degree or a right turning degree corresponding to a pivot angle when the steering wheel 15 is pivoted to either side from the neutral position (straight traveling state). The vehicle speed command calculation section 53, upon receipt of an acceleration operation amount from the acceleration detector 91b, calculates a vehicle speed command corresponding to this acceleration operation amount. The actual turning angular velocity calculation section 54 calculates an actual turning angular velocity t with using an actual turning angular velocity from the detection signal of the angular velocity sensor 92c.

Figure 5:
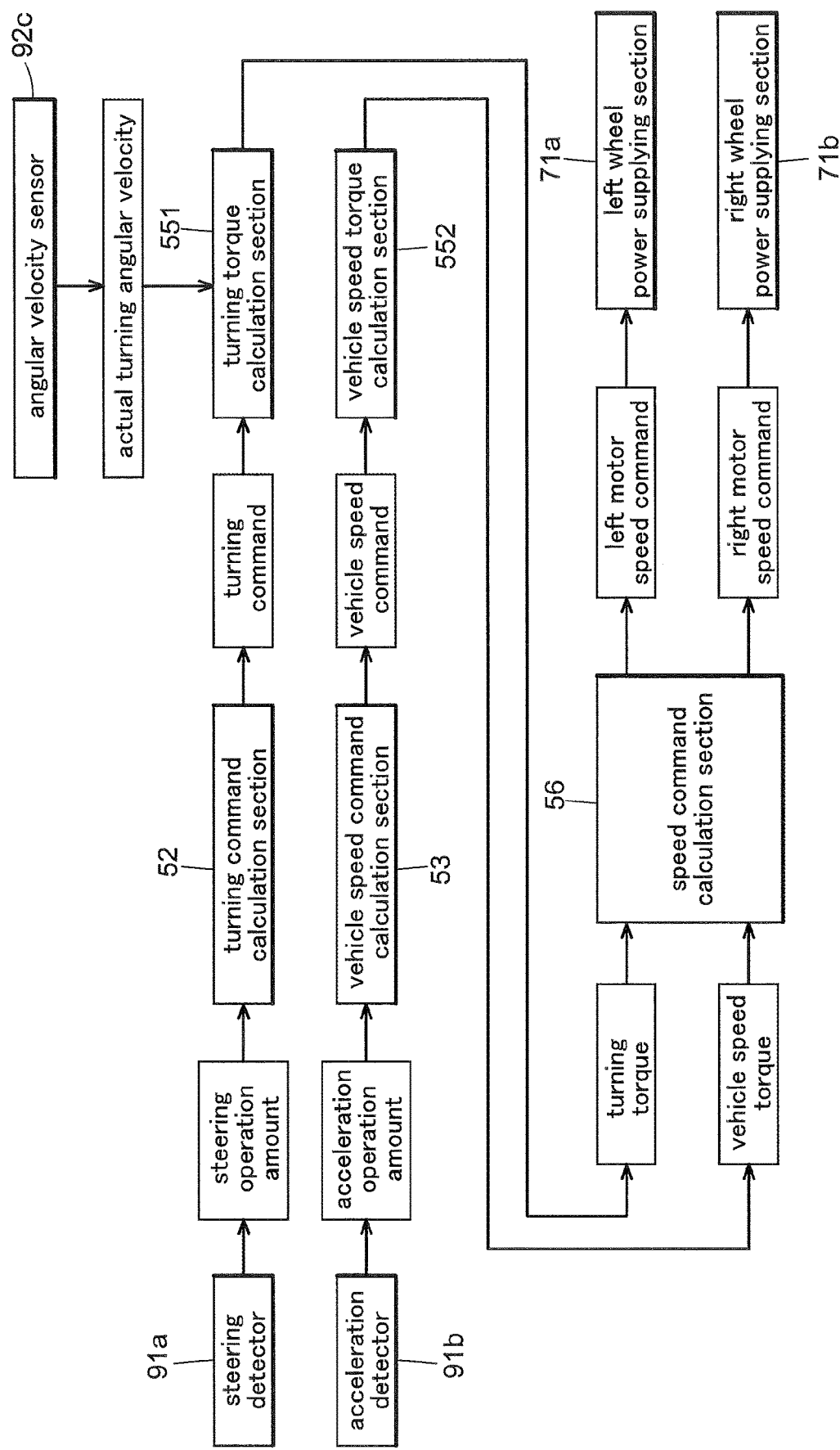
FIG. 5 is a block diagram showing flow of data relating to traveling motor control.

As shown in FIG. 4, the traveling motor control section 55 includes a turning torque calculation section 551, a vehicle speed torque calculation section 552 and a speed command calculation section 56. As shown in FIG. 5, the turning torque calculation section 551 calculates a turning angular velocity from a turning command from the turning command calculation section 52 and calculates a turning torque with using an actual turning angular velocity calculated by the actual turning angular velocity calculation section 54 as a feedback amount. The vehicle speed torque calculation section 552 calculates a vehicle speed torque based on a vehicle speed command from the vehicle speed command calculation section 53.

The speed command calculation section 56 calculates a speed command in order to realize turning of the vehicle body 10 suited to driver's operations on the steering wheel 15 and the acceleration detector 91b, based on a turning torque from the turning torque calculation section 551 and a vehicle speed torque from the vehicle speed torque calculation section 552. Such speed command includes a left motor speed command for producing a rational speed (number of revolutions) of the left driving wheel 2a, namely, a rotational speed (number of revolutions) of the left motor 81 and a right motor speed command for producing a rational speed (number of revolutions) of the right driving wheel 2b, namely, a rotational speed (number of revolutions) of the right motor 82. To this end, the speed command calculation section 56 includes a left motor speed command calculation section 56a for calculating the left motor speed command and a right motor speed command calculation section 56b for calculating the right motor speed command.

As the left motor 81 and the right motor 82 are inverter-controlled, the left motor speed command and the right motor speed command are provided to the traveling motor inverter 71. This traveling motor inverter 71 includes a left wheel power supplying section 71a and a right wheel power supplying section 71b, so that the left motor 81 and the right motor 82 have their respective rotational speeds varied independently according to amounts of electric power supplied thereto by the left wheel power supplying section 71a and the right wheel power supplying section 71b. By making the rotational speeds of the left driving wheel 2a and the right driving wheel 2b different from each other, a turning of the vehicle body 10 is effected.

The mower motor control section 57, in response to input to the control device 5 of an operation command commanding driving of the mower motor 4, controls a mower motor power supplying section 72a of the mower motor inverter 72.

At least some of the functional sections provided in the control device 5 for calculating various kinds of data are configured as lookup tables for deriving output data from input data. Further, such lookup tables can be adapted to be variable by a driver or a work. With this, it becomes possible to create a turning performance suited to the driver's preference.

Other Embodiments (1) In the foregoing embodiment, the angular velocity sensor 92c is used for obtaining an actual turning angular velocity of the vehicle body 10. Instead of providing such angular velocity sensor 92c, an actual turning angular velocity estimation lookup table may be used for deriving an actual turning angular velocity with using a left motor speed and a right motor speed as input values. Such actual turning angular velocity estimation lookup table can be created based on the specification unique to the vehicle body (especially, its turning characteristics).

(2) The functional blocks shown in FIG. 4 and FIG. 5 are sectioned from each other mainly for the purpose of explanation. Thus, these respective functional blocks can be further divided or combined with each other as desired.

(3) The electrically powered work vehicle in the foregoing embodiment is configured as a grass mower. However, the present invention is applicable also to a spraying vehicle, a snow plowing vehicle, a transporter vehicle, etc. as well.

INDUSTRIAL APPLICABILITY

The present invention is applicable to an electrically powered work vehicle configured such that a left driving wheel and a right driving wheel are driven based on a steering operation amount by a steering wheel and an acceleration operation amount by an acceleration operation tool.

REFERENCE SIGN LIST

2a: left driving wheel
2b: right driving wheel
10: vehicle body
15: steering wheel
17: accelerator pedal
5: control device
51: input signal processing section
52: turning command calculation section
53: vehicle speed command calculation section
54: actual turning angular velocity calculation section
55: traveling motor control section
551: turning torque calculation section
552: vehicle speed torque calculation section
56: speed command calculation section
56a: left motor speed command calculation section
56b: right motor speed command calculation section
57: mower motor control section
71a: left wheel power supplying section
71b: right wheel power supplying section
81: left motor
82: right motor
91: maneuvering state detection section
91a: steering detector
91b: acceleration detector
92: traveling state detection section
92a: left motor rotation detection sensor
92b: right motor rotation detection sensor
92c: angular velocity sensor
93: mower motor rotation detection sensor

The invention claimed is:

1. An electrically powered work vehicle comprising:
a vehicle body;
a left driving wheel and a right driving wheel that are supported to the vehicle body;
a left motor for driving the left driving wheel and a right motor for driving the right driving wheel;
a steering wheel for steering the vehicle body;
an angular velocity sensor;
an acceleration operation tool for adjusting a traveling speed of the vehicle body;
a steering detector for detecting a steering operation amount of the steering wheel;
an acceleration detector for detecting an acceleration operation amount of the acceleration operation tool;
a turning command calculation section for calculating a turning command based on the steering operation amount;
a turning torque calculation section for calculating a turning torque;
a vehicle speed command calculation section for calculating a vehicle speed command based on the acceleration operation amount;
a vehicle speed torque calculation section for calculating a vehicle speed torque based on the vehicle speed command; and
a speed command calculation section for calculating a left motor speed command and a right motor speed command based on the turning torque and the vehicle speed torque,
wherein a target turning angular velocity is calculated from the turning command, an actual turning angular velocity is determined from a detection signal of the angular velocity sensor, and the turning torque calculation section is configured to calculate the turning torque based on a difference between the target turning angular velocity and the actual turning angular velocity.

* * * * *